United States Patent
Seetzen et al.

(10) Patent No.: US 8,434,887 B2
(45) Date of Patent: May 7, 2013

(54) OPTICAL MIXING AND SHAPING SYSTEM FOR DISPLAY BACKLIGHTS AND DISPLAYS INCORPORATING THE SAME

(75) Inventors: Helge Seetzen, Westmount (CA); Lorne A. Whitehead, Vancouver (CA); Gregory J. Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/386,227

(22) PCT Filed: Aug. 23, 2010

(86) PCT No.: PCT/US2010/046280
§ 371 (c)(1),
(2), (4) Date: Jan. 20, 2012

(87) PCT Pub. No.: WO2011/025724
PCT Pub. Date: Mar. 3, 2011

(65) Prior Publication Data
US 2012/0140446 A1    Jun. 7, 2012

Related U.S. Application Data

(60) Provisional application No. 61/237,659, filed on Aug. 27, 2009.

(51) Int. Cl.
*F21V 13/04*     (2006.01)
*G02F 1/13357*   (2006.01)

(52) U.S. Cl.
USPC ............ 362/97.3; 362/231; 362/249.02

(58) Field of Classification Search ........... 362/97.1, 362/612, 97.2, 231, 97.3, 249.02; 349/69
See application file for complete search history.

(56) References Cited

U.S. PATENT DOCUMENTS

| | | | |
|---|---|---|---|
| 6,655,825 B2 | 12/2003 | Muthu | |
| 6,791,636 B2 | 9/2004 | Paolini | |
| 7,385,653 B2 | 6/2008 | Kim | |
| 7,403,332 B2 | 7/2008 | Whitehead | |
| 8,272,771 B2 * | 9/2012 | Arai | 362/608 |
| 2004/0062040 A1 * | 4/2004 | Blume et al. | 362/231 |
| 2005/0259195 A1 | 11/2005 | Koganezawa | |
| 2006/0291203 A1 | 12/2006 | Anandan | |
| 2007/0052662 A1 | 3/2007 | Kim | |
| 2007/0052663 A1 | 3/2007 | Kim | |
| 2007/0247833 A1 | 10/2007 | Lee | |
| 2008/0068860 A1 | 3/2008 | Peng | |
| 2008/0180466 A1 | 7/2008 | Whitehead | |
| 2009/0097230 A1 | 4/2009 | Masuda | |
| 2009/0213294 A1 * | 8/2009 | Jung et al. | 349/61 |
| 2010/0061087 A1 * | 3/2010 | Stevens et al. | 362/97.3 |

FOREIGN PATENT DOCUMENTS
JP    2002-099250    4/2002

\* cited by examiner

*Primary Examiner* — Peggy A. Neils

(57) ABSTRACT

A backlight (42, 62) for a display (40, 60) comprises a plurality of independently controllable light sources (48) and inclined surfaces inclining in a radially outward direction from each light source for shaping the distribution of emitted light. The light sources (48) may each comprise a group of differently-colored light emitters. The backlight 842, 62) may include light integrators (64) configured to mix light of the differently-colored light emitters. Inclined surfaces (44) for shaping the distribution of emitted light may be arranged around exits of the light integrators (64).

26 Claims, 5 Drawing Sheets

OPTICAL MIXING AND SHAPING SYSTEM FOR DISPLAY BACKLIGHTS AND DISPLAYS INCORPORATING THE SAME

CROSS-REFERENCE TO RELATED APPLICATIONS

This application claims priority to U.S. Provisional Patent Application No. 61/237,659 filed Aug. 27, 2009, hereby incorporate by reference in its entirety.

TECHNICAL FIELD

This invention relates generally to backlit displays and to backlights for such displays.

BACKGROUND

Some displays, such as liquid crystal displays (LCDs), comprise a spatial light modulator that is illuminated by a backlight. Light from the backlight interacts with the spatial light modulator which spatially modulates the light so as to present images to a viewer. The images may be still images or video images for example. The spatial light modulator may comprise an array of controllable pixels.

In some such displays, the backlight includes multiple light emitting devices, such as LEDs, for illuminating regions of the spatial light modulator. Such light emitting devices or groups of such light emitting devices may be separately controllable so that the intensity of light emitted by the backlight can be made to vary in a desired way over the spatial light modulator. Such displays are referred to herein as dual-modulation displays. Some examples of dual modulation displays are described in: U.S. Pat. No. 7,403,332 issued 22 Jul. 2008 and entitled "High Dynamic Range Display Devices", and United States Patent Application Publication No. 2008/0180466 published 31 Jul. 2008 and entitled "Rapid Image Rendering on Dual-Modulator Displays", which are hereby incorporated herein by reference for all purposes.

A challenge associated with dual-modulation displays is to provide a backlight capable of providing illumination having an intensity and/or spectral composition that varies in a desired way from point to point on the spatial light modulator.

SUMMARY

One aspect of this invention provides displays. The displays may comprise, for example, computer displays, televisions, video monitors, home cinema displays, stadium displays, specialized displays such as displays for medical imaging, virtual reality, 3-D displays, or the like. Another aspect of the invention provides backlights for displays.

In addition to the exemplary aspects and embodiments described above, further aspects and embodiments will become apparent by reference to the drawings and by study of the following detailed descriptions.

BRIEF DESCRIPTION OF DRAWINGS

Example embodiments are illustrated in the accompanying drawings. The embodiments disclosed herein are illustrative and are not intended to be restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
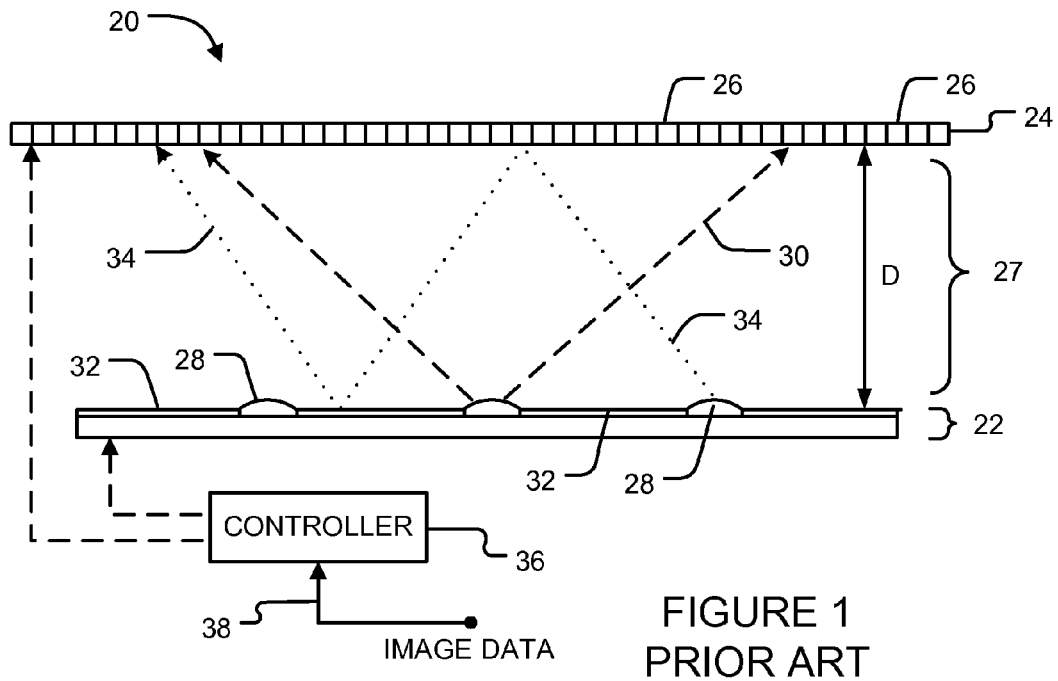
FIG. 1 is a partial cross-section schematic view of a display having a backlight with a flat reflecting surface.

FIG. 1 is a schematic cross section view of a display 20 of a general construction known in the prior art. Display 20 has a backlight 22 which illuminates an LCD panel 24. LCD panel 24 comprises an array of pixels 26 which can be controlled to pass varying amounts of the light incident on them to a viewing area.

Backlight 22 comprises a plurality of individually-controllable light emitting diodes (LEDs) 28. Each LED 28, when on, illuminates an area of LCD panel 24 after passing through region 27. Light emitted from LEDs 28 spreads out as it crosses region 27, as illustrated for example by dotted line 30. Light from each of the LEDs 28 spreads out according to a point-spread function (PSF) dependent on the characteristics of the LED as well as the characteristics and geometry of region 27.

It is generally desirable that LEDs 28 be capable of evenly illuminating LCD panel 24 or smoothly varying the brightness of illumination from place to place across LCD panel 24 in response to image data. Gaps or sharp transitions in illumination may produce undesirable visible artifacts. In the display 20 shown in FIG. 1, relatively even illumination is achievable by ensuring that light from neighboring LEDs 28 overlaps at LCD panel 24. This, in turn, is achieved by providing a suitable distance D between LEDs 28 and LCD panel 24. Distance D sets a lower limit on the thickness of display 20. The greater distance D, the more light from different LEDs 28 may overlap. When light from LEDs of different colors is combined at LCD panel 24, this overlapping of light may also allow for greater mixing of the different colors of light before they impinge on LCD panel 24.

As illustrated by light ray 34 in FIG. 1, some portion of light incident on LCD panel 24 may be reflected back toward backlight 22 rather then entering LCD panel 24 as ideally is desired. To avoid inefficient dissipation of such reflected light, backlight 22 may be coated with or made to have a reflective surface 32 to reflect light back toward LCD panel 24. In display 20, surface 32 is substantially flat and therefore light reflects off it in a direction away from the originating light source, as illustrated by light ray 34. Such reflected light may eventually enter LCD panel 24 at a location considerably far from the primary target area of its originating light source (where the primary target area of a light source is that area of the LCD panel that is closer to that light source than any other light source).

Display 20 comprises a controller 36 that controls the intensity of light emitted by LEDs 28 and also the transmissivity of pixels 26 of LCD panel 24 in response to image data received at an input 38.

One drawback to light spreading or reflecting significantly beyond its primary target area on a spatial light modulator (as illustrated for example by light rays 30 and 34 in FIG. 1) is that it compromises the ability to locally control the brightness of light incident on the spatial light modulator in a desired way. The more widely that light from different light sources on a backlight spreads to overlap with light from other light sources, the more difficult it becomes to independently control the brightness at specific areas of the spatial light modulator. The inventors have determined that, in certain applications of dual-modulation displays, it is generally desirable that light from each light source overlaps somewhat but not too much with light from other sources.

For example, one intended benefit of dual-modulation displays is that they be capable of producing purer blacks in displayed images than conventional displays, and hence provide improved contrast ratios. Typically, a spatial light modulator (SLM) such as an LCD display allows some incident light to leak through to a viewer even when it is controlled to block light to produce a black image. Thus, a backlit SLM controlled to appear black may appear dark brown or grey to a viewer, rather than pure black as desired. A truer black is achievable over an area of an SLM if the backlight is controllable to not illuminate that area of the SLM (e.g. if the backlight is locally dimmed). For example, where an image contains a dark area on a bright background, a dual-modulation display would ideally be capable of brightly illuminating the areas of the SLM corresponding to bright portions of the image while not illuminating (or not significantly illuminating) areas of the SLM corresponding to dark portion of the image. This in turn should be controllable by turning on and off and/or controlling the intensities of appropriate light sources on the backlight. However, the more that light from each light source can spread to illuminate neighboring dark areas of the SLM, the less that such dark areas will appear pure black in the resulting image.

Figure 2:
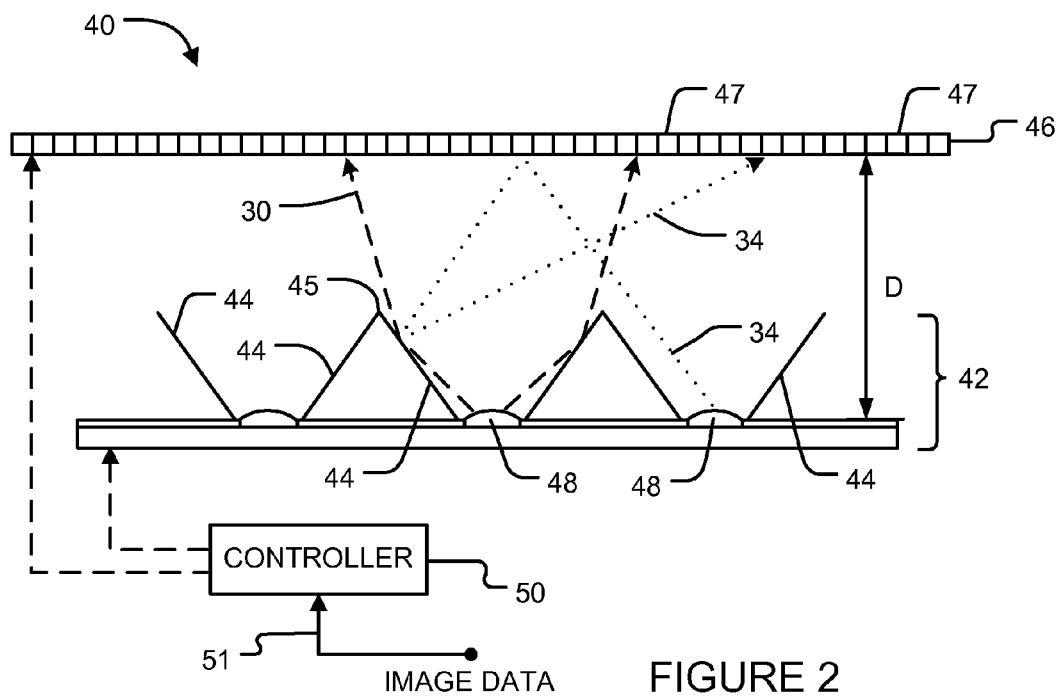
FIG. 2 shows a partial cross-section schematic view of a display having a backlight with inclined reflecting surfaces according to an example embodiment of the present invention.

FIG. 2 shows a display 40 having a backlight 42 that illuminates a spatial light modulator 46. Spatial light modulator 46 comprises an array of individually-controllable elements or pixels 47 which can be controlled to pass varying amounts of the light incident on them to a viewing area. Each pixel 47 of spatial light modulator 46 may have a plurality of addressable sub-pixels associated with corresponding color filters. The sub-pixels are controllable to vary the amount of light of each color that is passed to a viewer. Spatial light modulator 46 may, for example, comprise a reflection-type spatial light modulator or a transmission-type spatial light modulator. By way of example, spatial light modulator 46 may comprise a liquid crystal display (LCD) panel. The display panel may be, for example, an RGB or RGBW display panel. In other example embodiments, spatial light modulator 46 may comprise a liquid crystal on silicon (LCOS) or other suitable reflective-type or transmission spatial light modulator.

Backlight 42 comprises a plurality of individually-controllable light sources 48. Each light source 48, when on, illuminates an area of spatial light modulator 46. Each light source comprises one or more light-emitting devices such as LEDs, plasma light emitters, cold cathode light emitters, light-emitting semiconductor junctions. or the like. In display 40, the surface of backlight 42 is ridged rather than level around light sources 48. As illustrated, each light source 48 is surrounded on all sides by inclined surfaces 44 such that each light source 48 is in a cavity 44A formed by inclined surfaces 44. In preferred embodiments, the surface of backlight 42 comprises a repeating pattern of inclined surfaces 44 that tile the backlight 42.

In some embodiments, each cavity 44A hosts a light source 48. The inclined surfaces 44 of adjacent light sources 48 meet at apexes 45. Preferably, inclined surfaces 44 are at no points parallel to spatial light modulator 46 and thus apexes 45 are discontinuous. In some embodiments, the slope of inclined surfaces 44 remains substantially constant. In other embodiments, the slope of inclined surfaces 44 becomes steeper toward an apex 45. The height of inclined surfaces 44 relative to distance D may vary. The elevation of inclined surfaces 44 is not drawn to scale in FIG. 2.

Figure 3A:
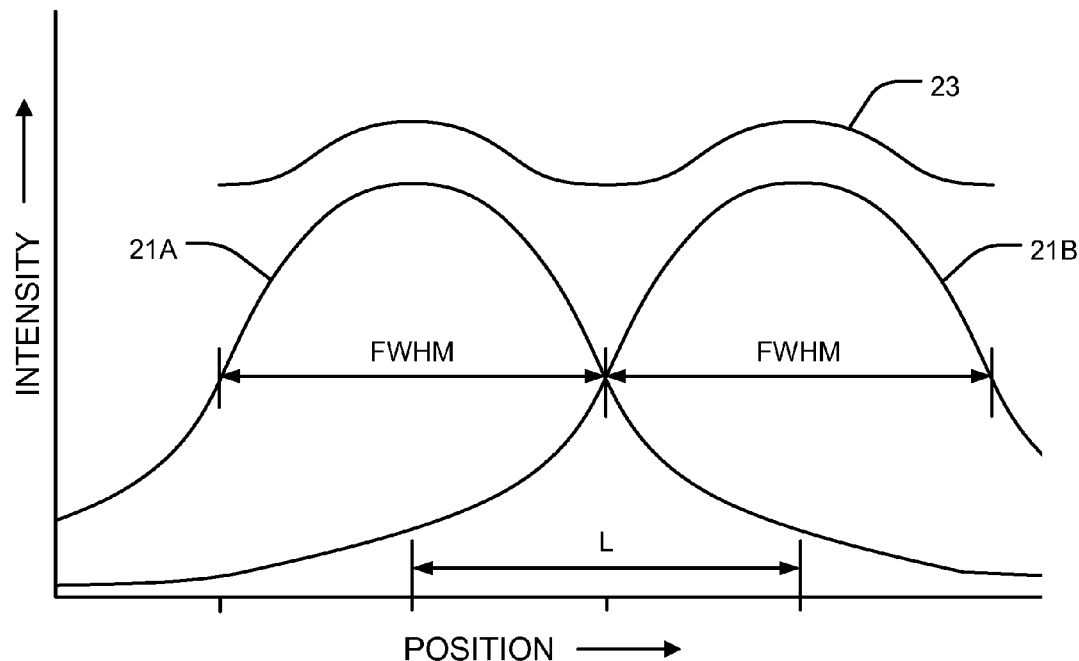
FIG. 3A illustrates overlapping point spread functions of adjacent light sources in a display like that of FIG. 1.
Figure 3B:
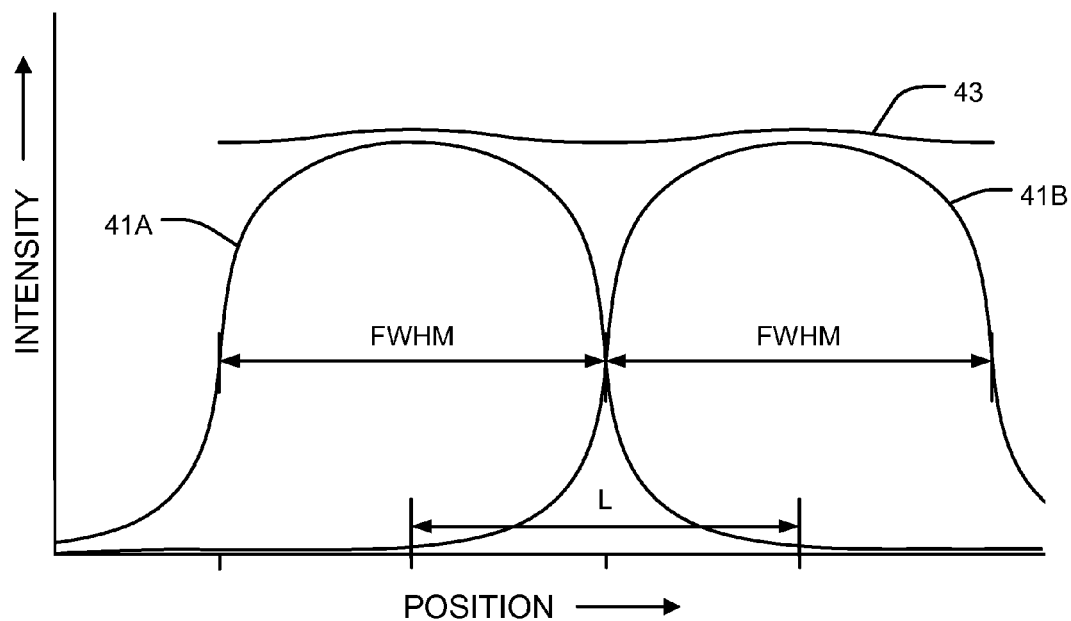
FIG. 3B illustrates the overlapping point spread functions of adjacent light sources in a display like that of FIG. 2.

As illustrated in FIG. 2, inclined surfaces 44 are reflective. A purpose of inclined surfaces 44 is to increase the proportion of the light emitted from a given light source 48 that is contained within a corresponding target area of spatial light modulator 46. Inclined surfaces 44 shape the point spread function of light sources 48 so that the distribution of light across spatial light modulator 46 is more flat within the target area and more attenuated beyond the target area (as illustrated in FIGS. 3A and 3B described further below). For example, as illustrated by light rays 30, inclined surfaces 44 in display 40 cause wide-spreading light rays to be deflected inward toward spatial light modulator 46 at a narrower angle than they would otherwise have. Also, as illustrated by light ray 34, inclined surfaces 44 in display 40 cause any light reflected back toward backlight 42 to be re-directed back toward the desired target area of spatial light modulator 46 of its originating light source.

Figure 6A:
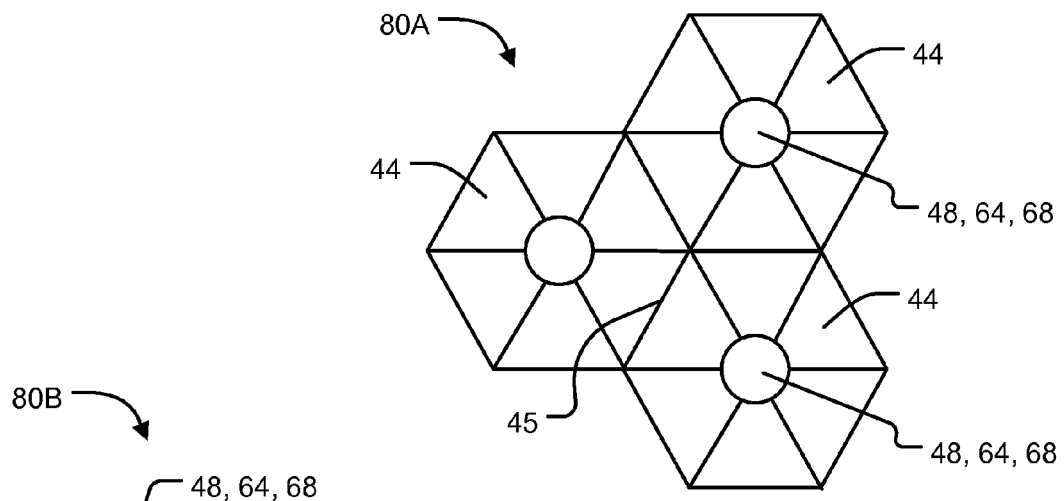
FIGS. 6A-6D show schematic partial plan views of backlights illustrating various configurations of light sources and inclined surfaces according to embodiments of the present invention.

FIGS. 6A-6D show partial plan views of backlights 80A-80D respectively, illustrating some example configurations of the surface of backlights according to embodiments of the present invention. In each example, light sources 48 are each surrounded by one or more inclined surfaces 44 in a repeating pattern that may tile the entire backlight. FIG. 6A illustrates a backlight 80A having a hexagonal configuration, wherein six inclined surfaces 44 form a hexagonal cavity around each light source 48. As shown, such hexagonal cavities may be arranged together in a continuous tiled pattern across backlight 80A. Inclined surfaces 44 of adjacent hexagonal cavities meet at apexes 45.

Figure 6B:
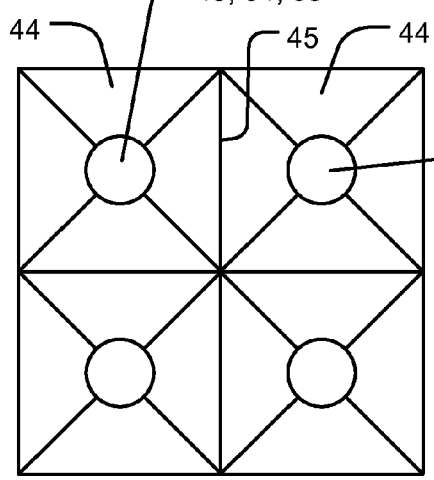
Figure 6C:
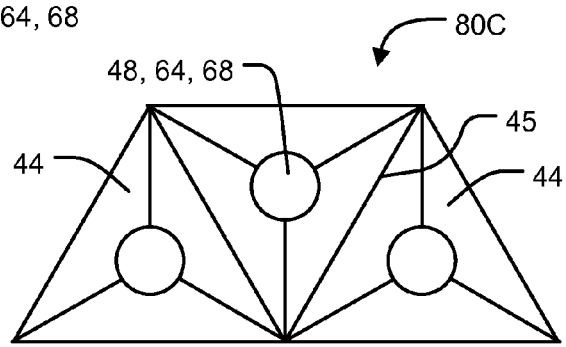
Figure 6D:
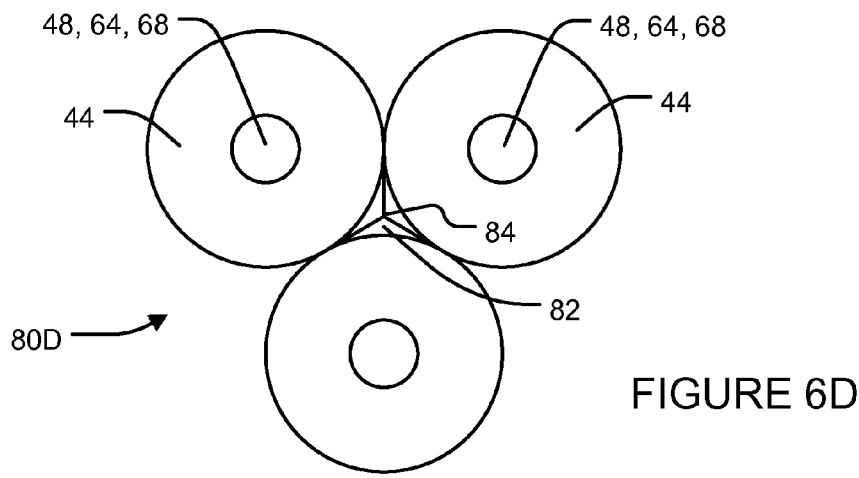

Similarly, FIG. 6B illustrates a backlight 80B having a square configuration and FIG. 6C illustrates a backlight 80C having a triangular configuration (wherein inclined surfaces 44 form a square or triangular cavity around each light source 48 respectively). As shown, such square or triangular cavities may also be arranged together in a continuous tiled pattern across the backlights with inclined surfaces 44 of adjacent cavities meeting at apexes 45. FIG. 6D illustrates a backlight 80D having a circular configuration, wherein a single curved inclined surface 44 forms a conical cavity around each light source 48. A drawback of this configuration is that such conical cavities do not tile over the entire area of backlight 80D. In this case, a ridge 82 may be used to cover the gaps between adjacent conical cavities. As illustrated, ridge 82 may have three inclined faces joining at an apex 84.

Light sources 48 and inclined surfaces 44 may be arranged on backlights in configurations other than those illustrated in FIGS. 6A-6D. It is not necessary for example that light sources 48 be round as illustrated. It is not necessary that inclined surfaces 44 be arranged in any particular repeating geometric pattern across the backlight. Generally, light sources 48 are positioned so as to provide sufficient light to illuminate the entire area of a spatial light modulator, and inclined surfaces 44 are configured to confine the spread of light from each light source.

Display 40 comprises a controller 50 that generates driving signals that control light sources 48 of backlight 42 to emit light having an intensity that varies spatially over the area of spatial light modulator 46. Controller 50 also generates control signals that control the pixels 47 of spatial light modulator 46. Controller 50 receives image data at an input 51 and, based on the image data, generates the control signals to cause a viewer to see images according to the image data. The image data may comprise data specifying one or more still images or data specifying a moving image (for example, a sequence of video frames). Controller 50 may comprise one or more of: logic circuits (which may be hard-wired or provided by a configurable logic device such as a field-programmable gate array—'FPGA'); one or more programmed data processors (for example, the data processors may comprise microprocessors, digital signal processors, programmable graphics processors, co-processors or the like); and suitable combinations thereof. A tangible storage medium may be provided that contains instructions that can cause controller 36 or components within controller 36 to be configured to provide logic functions as described herein. The tangible storage medium may, for example, comprise software instructions to be executed by one or more data processors and/or configuration information for one or more configurable logic circuits.

FIG. 3A illustrates two example point spread functions 21A, 21B (collectively PSF 21) of adjacent light sources 28 in a display like that of FIG. 1. Each PSF 21 represents the intensity of light illuminating a cross-section of a spatial light modulator when the light source is turned fully on. The full width at half maximum (FWHM) of each PSF 21 is given by the distance between the two points at which the light intensity is half its maximum value. In the illustrated embodiment, PSFs 21A and 21B are identical in shape, but spaced apart by a distance L such that they intersect around their half-maximum points. Light sources 28 are correspondingly spaced apart on their backlight by a distance L approximately equal to the FWHM of their PSF.

Curve 23 is the sum of PSFs 21A and 21B and represents the total intensity of light illuminating the given cross-section of spatial light modulator 24 (assuming that the contribution of light from other light sources is negligible). As may be seen, the overlap of the PSFs of each light source allows for a relatively constant and smoothly varying total intensity 23 across spatial light modulator 24. Spacing apart light sources 28 on backlight 22 by a distance L greater than the FWHM of their PSF would reduce the extent to which light overlaps at spatial light modulator 24 and cause total intensity 23 to dip more severely between the light sources. Spacing apart light sources 28 on backlight 22 by a distance L much less than the FWHM of their PSF would increase the overlapping of light at spatial light modulator 24 and allow for a more smoothly varying total intensity 23 across spatial light modulator 24.

However, as discussed above, increasing the amount of overlap of light from multiple light sources along a spatial light modulator may make it more difficult to have independent localized control over the illumination of spatial light modulator 24. Also, for cost reasons, it is sometimes desirable to provide displays that do not have too many light sources. It is therefore generally desirable to limit the amount of light that overlaps between adjacent light sources, while providing a total illumination across spatial light modulator 24 that may vary smoothly. This may be achieved by shaping the PSF of each light source such that it attenuates relatively rapidly to near zero beyond its FWHM. Light from each light source is thus more confined to its particular target area of spatial light modulator.

FIG. 3B illustrates two overlapping point spread functions 41A, 41B (collectively PSF 41) of adjacent light sources 48 in a display like that of FIG. 2. As illustrated, the effect of inclined surfaces 44 is to shape the PSF curves such that light intensity is more level in the immediate vicinity of the light source, while producing a faster drop-off beyond this vicinity. In the illustrated embodiment, PSFs 41A and 41B still intersect at their half-maximum points and are still separated by a distance L equal to their FWHM, but the areas of their tail sections beyond the half-maximum points are significantly reduced as compared to PSF 21A and 21B in FIG. 3A. Thus, the spill-over of light from a given light source to the target area of other more distant light sources is significantly reduced. As well, in the illustrated embodiment, the total intensity 43 when all light emitters are on is seen to be generally more level than the equivalent total intensity 23 in FIG. 3A.

As is evident from FIG. 3B, PSF 41 of a given light source 48 overlaps with PSFs of its nearest neighboring light sources at a relatively significant ratio of its peak value (e.g. 50%), but only overlaps with the light from more distant light sources at relatively insignificant brightness levels. For example, in some embodiments, the light intensity of PSF 41 at a distance of L/2 on either side of its peak (where it intersects PSFs of neighboring light sources 48) may be greater than 45% of its peak value, while the light intensity of PSF 41 at a distance of L on either side of its peak (where it intersects PSFs of its next-nearest-neighbor light sources 48) may be less than 5% of its peak value. In other embodiments, the light intensity of PSF 41 at a distance of L/2 on either side of its peak (where it intersects PSFs of neighboring light sources 48) may be greater than 45% of its peak value, while the light intensity of PSF 41 at a distance of L on either side of its peak (where it intersects PSFs of its next-nearest-neighbor light sources 48) may be less than 1% of its peak value.

In some embodiments, controller 50 is configured to estimate the total light intensity (or light field) across spatial light modulator 46 based on a set of driving signals to light sources 48. Such light field estimation is described in principle for example in U.S. Pat. No. 7,403,332 (which is hereby incorporated by reference) as well as in US Patent Publication No. 2008/0180466.

By confining the spread of light from each light source 48 as described above, the light field estimation may be simplified. For example, in some embodiments, the total intensity of light at a given point on spatial light modulator 46 is estimated to within a sufficient degree of accuracy by taking into account just the contributions of light from the nearest light source 48 and its immediate neighbors. In other embodiments where light sources 48 are separated from their nearest neighbor by a distance L, the total intensity of light at a given point on spatial light modulator 46 is estimated by taking into account just the contributions of light from light sources 48 within a radius of that point. For example, a radius less than 2 L. If light sources 48 are arranged in a two-dimensional grid, then the light field may be estimated by taking into account just the contributions of light from the nearest nine or fewer, in some embodiments, four or fewer light sources 48.

Some embodiments of displays provide broadband white light emitters (e.g. LEDs) as the locally modulated light source in the backlight. Some embodiments provide narrowband light emitters of multiple colors (e.g. red, green and blue LEDs in separate or integrated packages) or a combination of narrow-band and broadband emitters. Light made up of a mixture of three or more primary colors such as red, green and blue may create sensations of a wide range of colors to an observer. A benefit of using a combination of narrow-band color emitters compared to providing only broadband white emitters is that the inclusion of narrow-band emitters allows for the display of more highly saturated color images.

Saturation is a measure which takes into account intensity of light and the degree to which the light is spread across the visible spectrum. Light that is both very intense and concentrated in a narrow wavelength range has a high saturation. Saturation is decreased as the intensity decreases and/or the light contains spectral components distributed over a broader wavelength band. Narrow-band light sources can advantageously provide highly-saturated colors. A set of narrow-band light sources of appropriate chromacities can provide a wide color gamut. Thus, displays having backlights providing an appropriate mix of narrow-band light may be capable of producing color images having higher saturation than displays having backlights providing only white or broadband light.

One of the challenges with providing separate emitters for light of different colors is that the separate emitters are typically not all located in exactly the same place and so the patterns of light from the different light emitters may not be coextensive. This raises the possibility of visible artifacts such as color fringing. In some embodiments, light from differently colored emitters is optically mixed before illuminating the spatial light modulator 46. Such mixing can reduce the prevalence of such visible color artifacts in the final image.

Figure 4A:
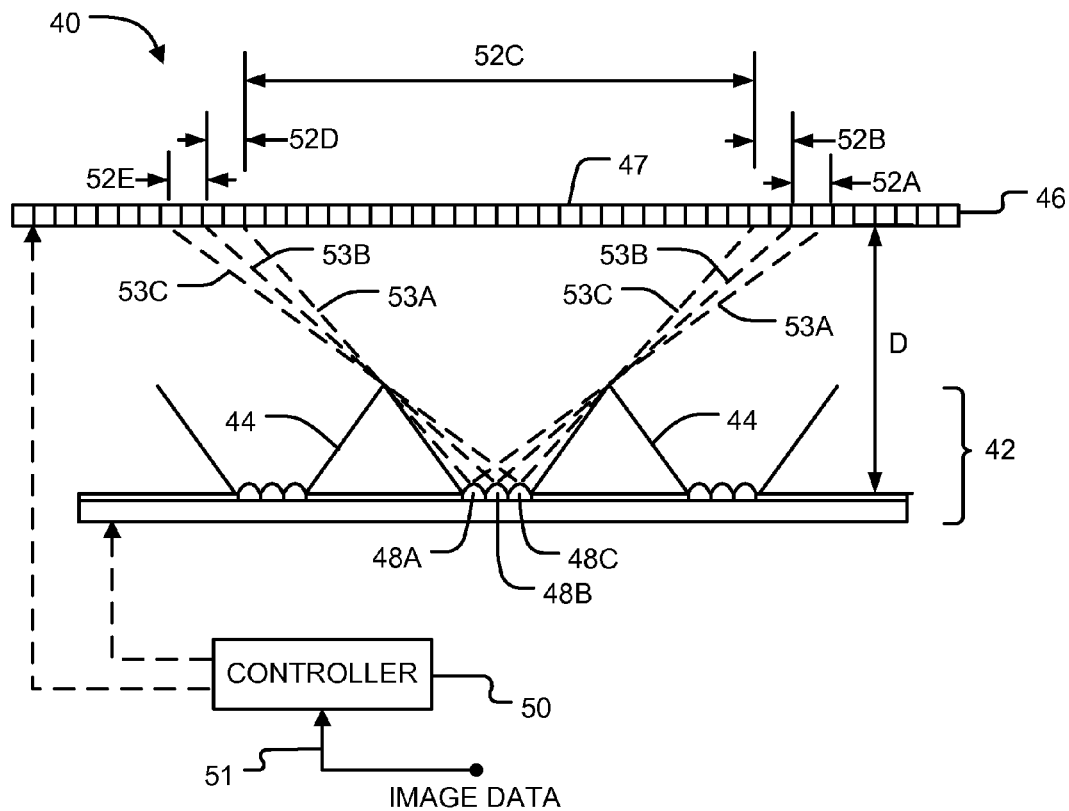
FIG. 4A shows a partial cross-section schematic view of a display like that of FIG. 2 wherein light sources of the backlight comprise three differently colored light emitters.

For example, FIG. 4A illustrates a variation of display 40 wherein each light source 48 comprises three primary color light emitters, 48A, 48B, and 48C. Light paths 53A, 53B and 53C represent the widest extent that light from each light emitter 48A, 48B and 48C respectively may travel without obstruction from inclined surfaces 44. As may be seen, the lateral spacing of each colored light emitter on the backlight 42 results in a lateral shift between the areas of illumination of each light emitter on the spatial light modulator. In other words, shadows produced by the inclined surfaces 44 surrounding light emitters, 48A, 48B, and 48C may result in colored fringes in the illumination pattern cast on the spatial light modulator 46. For example, in region 52A of spatial light modulator 46, light from light emitters 48B and 48C is blocked but light from light emitter 48A is not blocked. Similarly, in region 52E of spatial light modulator 46, light from light emitters 48A and 48B is blocked but light from light emitter 48C is not blocked. In regions 52B and 52D of spatial light modulator 46, light from light emitters 48C and 48A respectively is blocked. In the central region 52C of spatial light modulator 46, none of light emitters 48A, 48B and 48C is blocked.

Figure 4B:
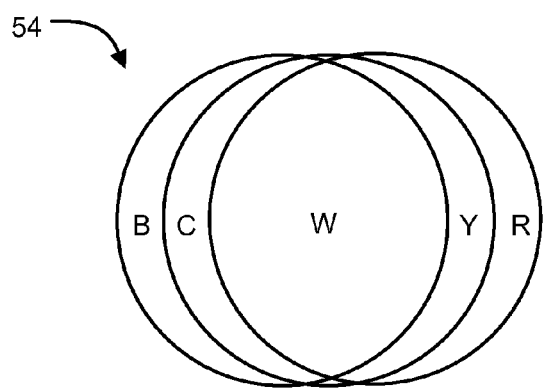
FIG. 4B illustrates an example illumination pattern made up of light from red, green and blue light emitters.

FIG. 4B illustrates an example color pattern 54 that could be produced on a spatial light modulator 46 where light emitters 48A, 48B and 48C in FIG. 4A are red, green and blue light emitters respectively and where inclined surfaces 44 surround the light emitters in a circle. The pattern 54 includes a blue fringe B, a cyan fringe C (green and blue overlapping), a white central region W (all three colors overlapping), a yellow fringe Y (red and green pattern overlapping) and a red fringe R. Such color fringing artifacts are potentially visible to the human eye and challenging to remove algorithmically (especially for moving image content).

For conventional (non-dual-modulation) displays, a solution to eliminating these color fringes is to widely diffuse the light from the light sources across spatial light modulator 46. For dual-modulation displays this option is not desirable as the light distribution from each light source is preferably spatially contained so as to be able to have localized control (for example, local dimming) over the illumination of the spatial light modulator 46.

Figure 5:
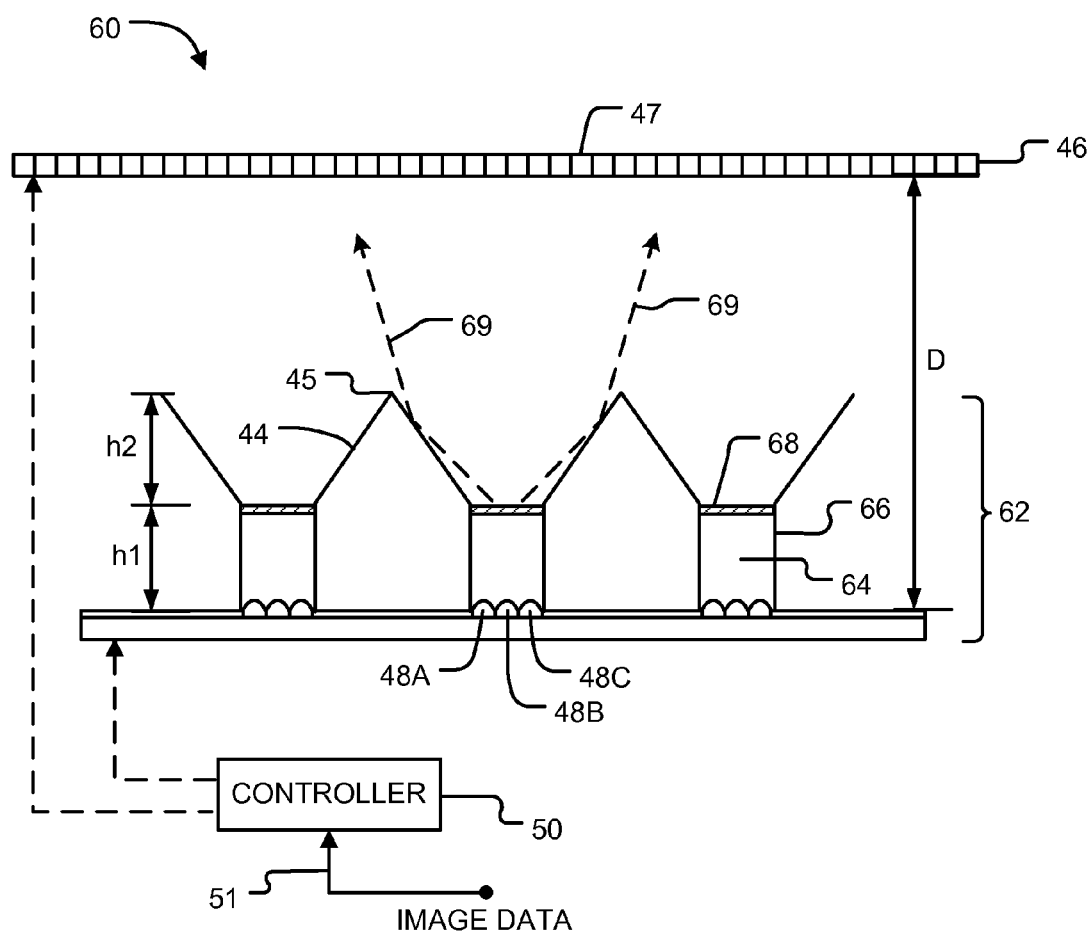
FIG. 5 shows a partial cross-section schematic view of a display having a backlight with light integrators and inclined reflecting surfaces according to an example embodiment of the present invention.

FIG. 5 illustrates a display 60 according to a particular embodiment of the present invention. Display 60 has a backlight 62 which illuminates spatial light modulator 46. In this embodiment, light from colored light emitters 48A, 48B and 48C (e.g. RBG light emitters) enters a light integrator 64. Inside the light integrator 64, the light from the emitters may reflect several times from walls 66 or other surfaces or scatterers to achieve thorough color mixing. The colored light is then emitted from light integrator 64 in a mixed state into region 27 of display 60. The exit 68 of light integrator 64 acts in effect as if it were a single light source emitting light of a homogenous color (e.g. white light or some other mixture of light from light sources 48A, 48B and 48C).

Backlight 62 of display 60 combines light integrators 64, for mixing light, with inclined surfaces 44, for spatially containing the distribution of the mixed light on spatial light modulator 46. Inclined surfaces 44 of backlight 62 may surround exits 68 of light integrators 64. As discussed above, the configuration of the inclined surfaces 44 appropriately shapes the PSF of the mixed light onto the pixels of a spatial light modulator 46. For example, inclined surfaces 44 in display 60 cause light rays 69 to be deflected inward toward spatial light modulator 46 such that they do not spread as widely from their originating light source 48 as they otherwise would.

Light integrator 64 may be generally cylindrical in shape or may be other shapes (e.g. rectangular, hexagonal, etc.) as long as a substantial amount of light mixing is achievable. In some embodiments, the diameter or width of light integrator 64 remains constant. In other embodiments, the diameter or width of light integrator 64 tapers and/or expands along its length. To enhance the scattering and intermixing of reflected light within light integrators 64, the walls 66 of light integrators 64 may be made of or coated with a diffusely reflective material. The interior body of light integrators 64 may be hollow (e.g. air) or may be a transparent solid material (e.g. an acrylic-based plastic such as polymethyl methacrylate/PMMA/Plexiglas™, glass, or the like). Such a clear solid material may have diffusing centers or diffusely reflecting particles embedded within it to enhance the mixing of light within light integrator 64. In some embodiments, light integrators 64 comprise two adjacent mediums having refractive indices suitable to create conditions for total internal reflection. In an example embodiment, light integrators 64 comprise transparent glass or plastic rods coated with white paint.

The entrance of light integrators 64 may be just open space (where the light integrator is hollow), or a surface of a solid material of the integrator that light from the emitters is incident on, or a more elaborate design to optimize the injection of light. For example, the entrance of light integrators 64 may comprise one or more lenses, a reflective chamber which collects light from the emitters and then injects the light into the pipe, a bundle of fibers coupled between the emitters and the light integrator, etc.). Light sources 48 coupled to the entrance of each light integrator 64 may comprise any number of light emitters of the same or different colors. For example, light sources 48 may comprise an array of RBG LEDs.

The exits 68 of light integrators 64 may also be shaped in a variety of ways to optimize the emission of light toward spatial light modulator 46 (e.g. shaped to provide a structured surface to increase diffusion, a lens, etc). The exit 68 of light integrator 64 may comprise a sheet of a different transmissive material than the body of the light integrator or may comprise the same material as the body of the light integrator. For example, exit 68 may comprise or be configured to operate as a diffuser having an FWHM angle ranging from 30° to 80°. In some embodiments holographic diffusers are provided at exits 68.

As described above, FIGS. 6A-6D illustrate example configurations of backlights comprising light sources 48 and inclined surfaces 44. These configurations are also applicable to backlights that incorporate light integrators 64 such as shown in FIG. 5. In such cases, inclined surfaces 44 form reflective cavities (e.g. hexagonal, square, triangular, conical, etc.) around the exits 68 of light integrators 64.

As illustrated in FIG. 5, light integrators 64 have a height h1, inclined surfaces 44 have a height h2, and a total distance D is provided between light sources 48 and spatial light modulator 46. These dimensions may be varied as necessary to achieve desired mixing and shaping of light. By way of non-limiting example, heights h1 and h2 may each be in the range of 4 mm to 16 mm. Distance D may range from 25 mm to 50 mm for example. Generally, the greater the height h1, the more that light may intermix within light integrator 64. On the other hand, there is consumer demand for displays that are very thin front-to-back and so it is generally desirable to have D be as small as possible. In one particular embodiment, a display 60 having a height h1 of approximately 8 mm, a height h2 of approximately 8 mm, a distance D of approximately 35 mm, and a 80° FWHM diffuser at exit 68 of light integrators 64 was found to yield sufficiently good mixing to effectively eliminate visible color fringing at spatial light modulator 46.

The entrance of light integrators 64 is preferably large enough to receive all light emitted from light sources 48, but not so large as to leave openings through which significant amounts of reflected light may leak out. In some embodiments, any gaps existing between light sources 48 and the entrances of light integrators 64 are covered by a reflective surface to prevent emitted light from escaping. In some embodiments, the entrances of light integrators 64 operate like a one-way mirror allowing light to light to enter but preventing light from escaping. In other embodiments, light integrators 64 enclose light sources 48 entirely.

As mentioned above, backlights according to embodiments of this invention may comprise a plurality of independently-controllable light-emitting elements of various types. The light emitting elements may include narrow-band light emitting elements and/or broad-band light emitting elements. Narrow-band light emitting elements may be of a plurality of colors that define a color gamut. For example, narrow-band light emitting elements may comprise:

sources of red, green and blue light;
  sources of red, green, blue and yellow light;
  sources of light of three, four, five or more primary colors that define a color gamut;
  etc.

By way of example, narrow-band light emitting elements may comprise light-emitting diodes (LEDs), other light-emitting semiconductor devices such as laser diodes, lasers, other sources of narrow-band light such as light that has been filtered by narrow-band filters, or the like. In some embodiments narrow-band light emitting elements each emit light that is monochromatic or quasi-monochromatic. In some embodiments the narrow-band light emitting elements emit light having a bandwidth of 50 nm or less.

Where a component (e.g. a light source, processor, controller, spatial light modulator, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Accordingly, the invention may be embodied in any of the forms described herein, including, but not limited to the following Enumerated Example Embodiments (EEEs) which describe structure, features, and functionality of at least some portions of the present invention:

EEE1. A backlight for illuminating a spatial light modulator of a display, the backlight comprising:
  a two-dimensional array of independently-controllable light sources;
  the light sources located in cavities, the cavities each comprising one or more reflective surfaces inclined in a radially inward direction toward one of the light sources.

EEE2. A backlight according to EEE 1 wherein the inclined surfaces of adjacent light sources adjoin along upper edges forming apexes.

EEE3. A backlight according to EEE 2 wherein a radial slope of the inclined surfaces is substantially constant.

EEE4. A backlight according to EEE 2 wherein a radial slope of the inclined surfaces increases towards the apexes.

EEE5. A backlight according to EEE 1 wherein the inclined surfaces are arranged around the light sources in a regular pattern that tiles the backlight.

EEE6. A backlight according to EEE 5 wherein each light source is surrounded by six inclined surfaces and the cavities are arranged in a tiled hexagonal pattern.

EEE7. A backlight according to EEE 5 wherein each light source is surrounded by four inclined surfaces and the cavities are arranged in a tiled square pattern.

EEE8. A backlight according to EEE 1 wherein each light source comprises a group of light emitters having different spectral compositions.

EEE9. A backlight according to EEE 1 wherein point spread functions of neighboring light sources overlap at values greater than 40% of their maximum values and point spread functions of non-neighboring light sources overlap at values less than 5% of their maximum values.

EEE10. A backlight according to EEE 1 wherein point spread functions of neighboring light sources overlap at values greater than 45% of their maximum value and point spread functions of non-neighboring light sources overlap at values less than 1% of their maximum value.

EEE11. A backlight according to EEE 1 comprising a controller that estimates total light intensities at a point on the spatial light modulator based on brightness levels of no more than a nearest light source and its immediate neighbors.

EEE12. A backlight according to EEE 1 wherein the light sources are arranged on the backlight in a regular two-dimensional grid and are separated from their nearest neighbors by a length.

EEE13. A backlight according to EEE 12 comprising a controller that estimates total light intensities at a point on the spatial light modulator based on brightness levels of no more than the nearest four light sources.

EEE14. A backlight for illuminating a spatial light modulator of a display, the backlight comprising:
  a plurality of independently controllable light sources, each light source comprising a group of two or more light emitters having different spectral compositions;
  a light integrator coupled to each light source such that the group of light emitters of the corresponding light source emits light into an entrance of the light integrator; and
  one or more inclined reflective surfaces inclining in a radially inward direction toward the spatial light modulator from an exit of each of the light integrators.

EEE15. A backlight according to EEE 9 wherein the light integrators are configured to mix the light received at their entrances and to emit mixed light toward the spatial light modulator.

EEE16. A backlight according to EEE 10 wherein the light integrators comprise diffusely reflective interior walls.

EEE17. A backlight according to EEE 11 wherein an interior body of the light integrators is hollow.

EEE18. A backlight according to EEE 11 wherein an interior body of the light integrators comprises a clear solid material.

EEE19. A backlight according to EEE 13 wherein the clear solid material comprises an acrylic-based plastic.

EEE20. A backlight according to EEE 13 wherein the light integrators comprise diffusing centers embedded in the clear solid material.

EEE21. A backlight according to EEE 11 wherein the light integrators are cylindrical.

EEE22. A backlight according to EEE 11 wherein the light integrators comprise transparent glass or plastic rods coated with white paint.

EEE23. A backlight according to EEE 11 wherein the exit of the light integrators comprises a transmissive diffuser.

EEE24. A backlight according to EEE 18 wherein the transmissive diffuser has a full-width at half-maximum (FWHM) angle in the range of 30° to 80°.

EEE25. A backlight according to EEE 11 wherein entrances of the light integrators comprise transmissive diffusers.

EEE26. A backlight according to EEE 11 wherein the light emitters of each light source comprise red, green and blue light emitters.

EEE27. A backlight according to EEE 11 wherein a height of the light integrators is in the range of 4 mm to 16 mm.

EEE28. A backlight according to EEE 11 wherein a height of the inclined surfaces is in the range of 4 mm to 16 mm.

EEE29. A backlight according to EEE 11 wherein a distance between the light sources and the spatial light modulator is in the range of 25 mm to 50 mm.

EEE30. A display comprising a spatial light modulator and a backlight according to any one of EEEs 1 to 29.

EEE31. Apparatus comprising any new and inventive feature, combination of features, or sub-combination of features as described and/or depicted herein.

EEE32. Methods comprising any new and inventive steps, acts, combinations of steps and/or acts, or sub-combinations of steps and/or acts as described and/or depicted herein.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. A backlight for illuminating a spatial light modulator of a display, the backlight comprising:
  a plurality of independently controllable light sources, each light source comprising a group of two or more light emitters having different emission spectra, and each light source comprising a light integrator with an entrance and an exit, said light integrator being arranged such that the group of light emitters of the light source emits light into an entrance of the light integrator and such that said light exits the light integrator at the exit of the light integrator in a mixed state; and
  a plurality of cavities, each located at the exit side of a respective one of the light integrators, each cavity comprising one or more reflective surfaces inclined toward around the exit of the respective light integrator in order to confine a spread of the light exiting the respective light integrator,
  wherein nearest neighboring light sources are spaced at a distance L,
  wherein first and second light respectively emitted by two nearest neighboring light sources when fully turned on and after being confined by the one or more reflective surfaces of the respective cavities, are angularly distributed so as to overlap between said two nearest neighboring light sources at intensities greater than 45% of their peak values, and
  wherein the angular intensity distribution of each light source, when fully turned on and after being confined by the one or more reflective surfaces of the respective cavities, is such that the intensity at a distance L from the light source is less than 1% of its maximum intensity.

2. A backlight according to claim 1 wherein the reflective cavities of surfaces of adjacent light sources adjoin along upper edges forming apexes.

3. A backlight according to claim 2 wherein a radial slope of the reflective surfaces is substantially constant.

4. A backlight according to claim 2 wherein a radial slope of the reflective surfaces increases towards the apexes.

5. A backlight according to claim 1 wherein the reflective surfaces are arranged in plan-view around the respective light integrator and the respective light source in a regular pattern that tiles the backlight.

6. A backlight according to claim 5 wherein each light source is surrounded in plan-view by six reflective surfaces and the cavities are arranged in a tiled hexagonal pattern.

7. A backlight according to claim 5 wherein each light source is surrounded in plan-view by four reflective surfaces and the cavities are arranged in a tiled square pattern.

8. A backlight according to claim 1 comprising a controller arranged to estimate a total light intensity at a point on the spatial light modulator based on the brightness levels of no more than the nearest light source and its immediate neighbors.

9. A backlight according to claim 1 wherein the light sources are arranged on the backlight in a regular two-dimensional grid and are separated from their nearest neighbors by said distance L.

10. A backlight according to claim 9 comprising a controller arranged to estimate a total intensity at a point on the spatial light modulator based on the brightness levels of no more than the nearest four light sources.

11. A backlight according to claim 1 wherein the light integrators are configured to emit the mixed light toward the spatial light modulator.

12. A backlight according to claim 11 wherein the light integrators comprise diffusely reflective interior walls.

13. A backlight according to claim 12 wherein an interior body of the light integrators is hollow.

14. A backlight according to claim 12 wherein an interior body of the light integrators comprises a clear solid material.

15. A backlight according to claim 14 wherein the clear solid material comprises an acrylic-based plastic.

16. A backlight according to claim 14 wherein the light integrators comprise diffusing centers embedded in the clear solid material.

17. A backlight according to claim 12 wherein the light integrators are cylindrical.

18. A backlight according to claim 12 wherein the light integrators comprise transparent glass or plastic rods coated with white paint.

19. A backlight according to claim 12 wherein the exit of the light integrators comprises a transmissive diffuser.

20. A backlight according to claim 19 wherein the transmissive diffuser has a full-width at half-maximum, FWHM, angle in the range of 30° to 80°.

21. A backlight according to claim 12 wherein the entrance of each light integrator comprises a transmissive diffuser.

22. A backlight according to claim 12 wherein the light emitters of each light source comprise red, green and blue light emitters.

23. A backlight according to claim 12 wherein the height of the light integrators is in the range of 4 mm to 16 mm.

24. A backlight according to claim 12 wherein the height of the reflective surfaces is in the range of 4 mm to 16 mm.

25. A backlight according to claim 12 wherein the distance between the light sources and the spatial light modulator is in the range of 25 mm to 50 mm.

26. A display comprising a spatial light modulator and a backlight according to claim 1.

* * * * *